(12) United States Patent
Plom et al.

(10) Patent No.: US 10,388,321 B2
(45) Date of Patent: Aug. 20, 2019

(54) LOOPING AUDIO-VISUAL FILE GENERATION BASED ON AUDIO AND VIDEO ANALYSIS

(71) Applicant: Twitter, Inc., San Francisco, CA (US)

(72) Inventors: Richard J. Plom, Clayton, CA (US); Jason J. Mante, New York, NY (US); Ryan W. Swigart, New York, NY (US); Mikhail Kaplinskiy, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 7 days.

(21) Appl. No.: 15/247,358

(22) Filed: Aug. 25, 2016

(65) Prior Publication Data

US 2017/0062006 A1 Mar. 2, 2017

Related U.S. Application Data

(60) Provisional application No. 62/210,315, filed on Aug. 26, 2015.

(51) Int. Cl.
*G11B 27/00* (2006.01)
*H04N 9/87* (2006.01)
*G11B 27/28* (2006.01)
*G11B 27/031* (2006.01)
*G11B 27/10* (2006.01)

(52) U.S. Cl.
CPC .......... *G11B 27/007* (2013.01); *G11B 27/031* (2013.01); *G11B 27/10* (2013.01); *G11B 27/28* (2013.01); *H04N 9/87* (2013.01)

(58) Field of Classification Search
CPC ............................ G11B 27/007; G11B 27/031
See application file for complete search history.

(56) References Cited

U.S. PATENT DOCUMENTS

| 2005/0182503 | A1* | 8/2005 | Lin | G11B 27/28 700/94 |
| 2005/0254782 | A1* | 11/2005 | Hsu | G11B 27/031 386/283 |
| 2013/0108241 | A1 | 5/2013 | Miyamoto et al. | |
| 2014/0270710 | A1* | 9/2014 | Vilermo | H04N 5/772 386/285 |

(Continued)

FOREIGN PATENT DOCUMENTS

EP 1666967 A1 6/2006

OTHER PUBLICATIONS

International Search Report and Written Opinion for PCT Patent Application No. PCT/US2016/048992, dated Nov. 28, 2016, 13 pages.

*Primary Examiner* — Girumsew Wendmagegn
(74) *Attorney, Agent, or Firm* — Brake Hughes Bellermann LLP

(57) ABSTRACT

In one general aspect, a method can include receiving a video loop portion included in a video file and receiving an audio loop portion included in an audio file. The method can include analyzing at least a portion of the audio file based on a musical characteristic and identifying a plurality of segment locations within the audio file based on the analyzing where the plurality of segment locations define a plurality of audio segments of the audio file. The method can also include modifying the video loop portion based on one of the plurality of segment locations in the audio file.

18 Claims, 14 Drawing Sheets

(56) References Cited

U.S. PATENT DOCUMENTS

| | | |
|---|---|---|
| 2015/0160916 A1 | 6/2015 | Lothian |
| 2015/0279427 A1* | 10/2015 | Godfrey ................. G11B 27/10 386/241 |
| 2016/0139871 A1* | 5/2016 | Farshi ..................... G06F 3/165 386/201 |

* cited by examiner

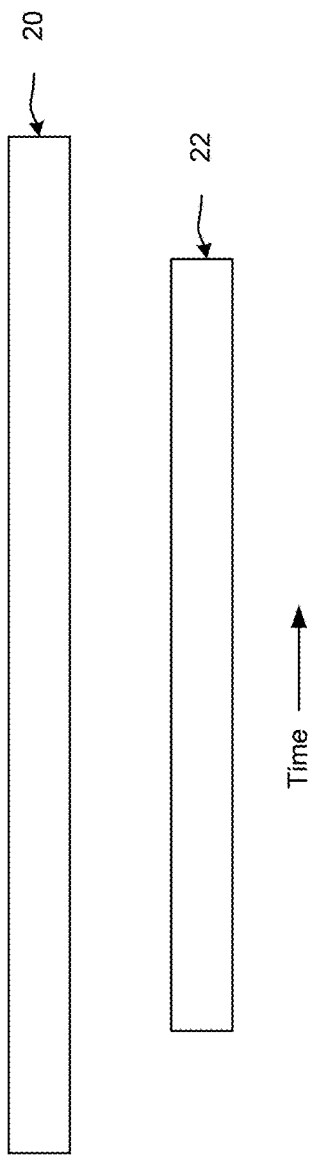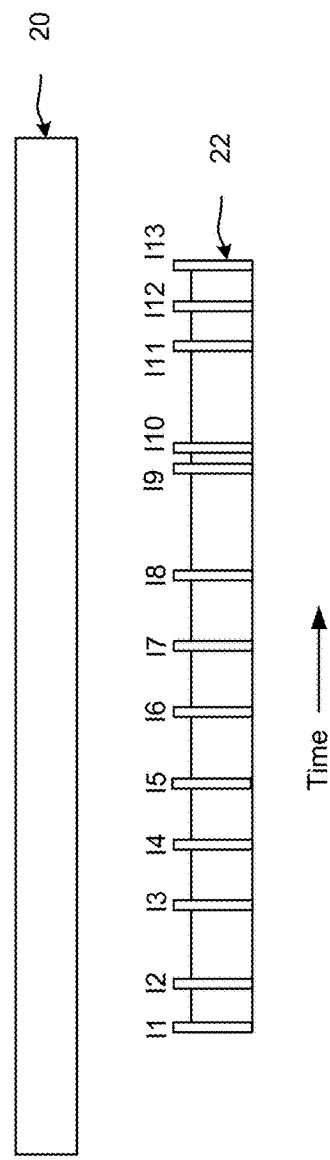

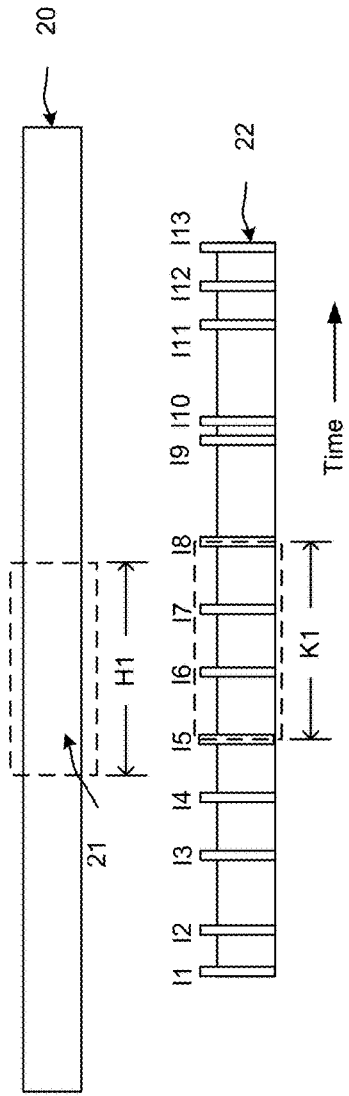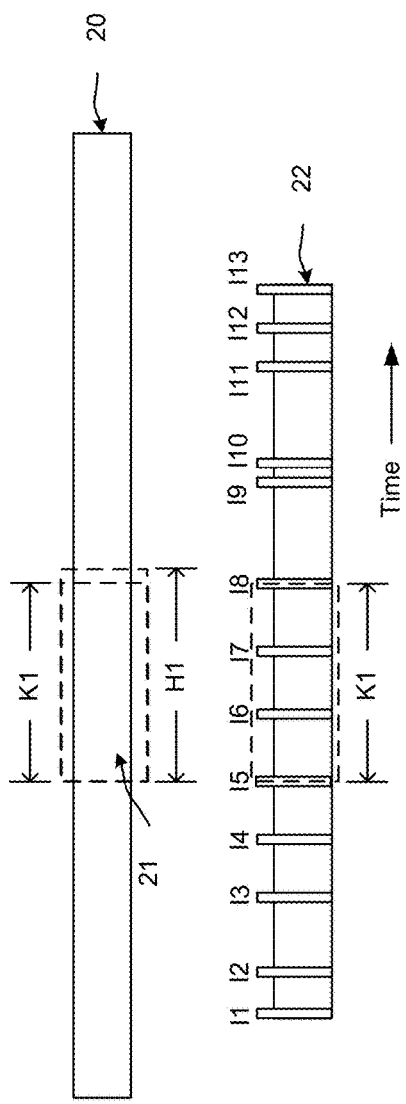

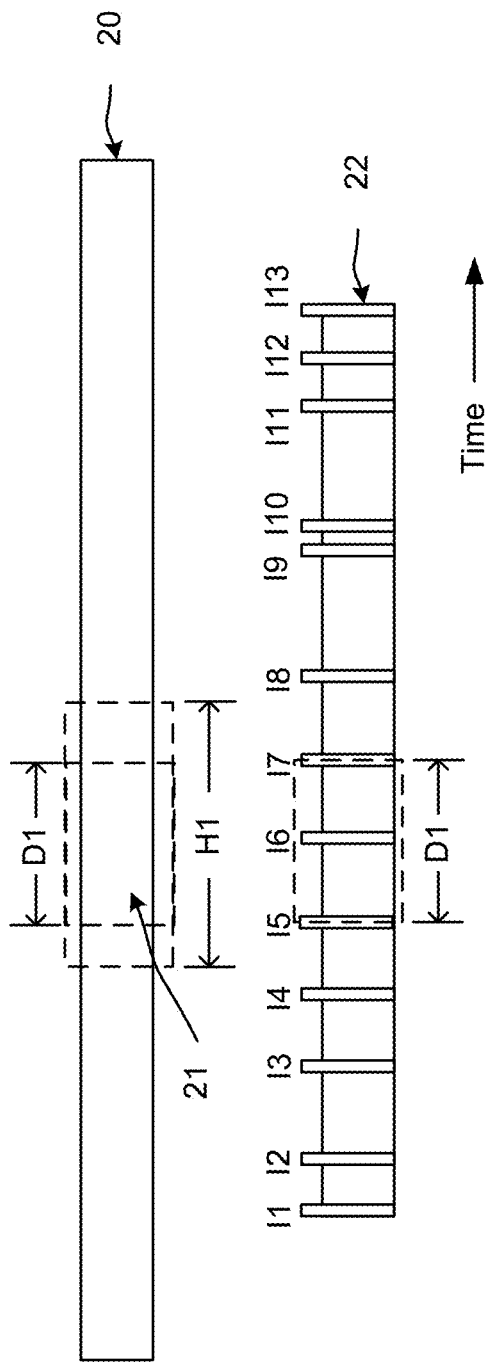

LOOPING AUDIO-VISUAL FILE GENERATION BASED ON AUDIO AND VIDEO ANALYSIS

RELATED APPLICATION

This application is a non-provisional of, and claims priority to, U.S. Provisional Application No. 62/210,315, filed on Aug. 26, 2015, entitled "Looping Audio-Visual File Generation Based on Audio and Video Analysis," the disclosure of which is incorporated herein in its entirety.

TECHNICAL FIELD

This description relates to generation of looping audio visual files for social media sharing.

BACKGROUND

Audio and video edit programs can be used to produce a file that includes both audio content and video content for, for example, social media sharing. These files can be looped during playback, but may not have audio content that matches with the video content. In addition, the audio content may be truncated in a fashion that makes the audio content undesirable for social media sharing. Thus, a need exists for systems, methods, and apparatus to address the shortfalls of present technology and to provide other new and innovative features.

SUMMARY

In one general aspect, a method can include receiving a video loop portion included in a video file and receiving an audio loop portion included in an audio file. The method can include analyzing at least a portion of the audio file based on a musical characteristic and identifying a plurality of segment locations within the audio file based on the analyzing where the plurality of segment locations define a plurality of audio segments of the audio file. The method can also include modifying the video loop portion based on one of the plurality of segment locations in the audio file.

The details of one or more implementations are set forth in the accompanying drawings and the description below. Other features will be apparent from the description and drawings, and from the claims.

BRIEF DESCRIPTION OF THE DRAWINGS

FIGS. 2A through 2E illustrate processing of a video file and an audio file.

DETAILED DESCRIPTION

Figure 1:
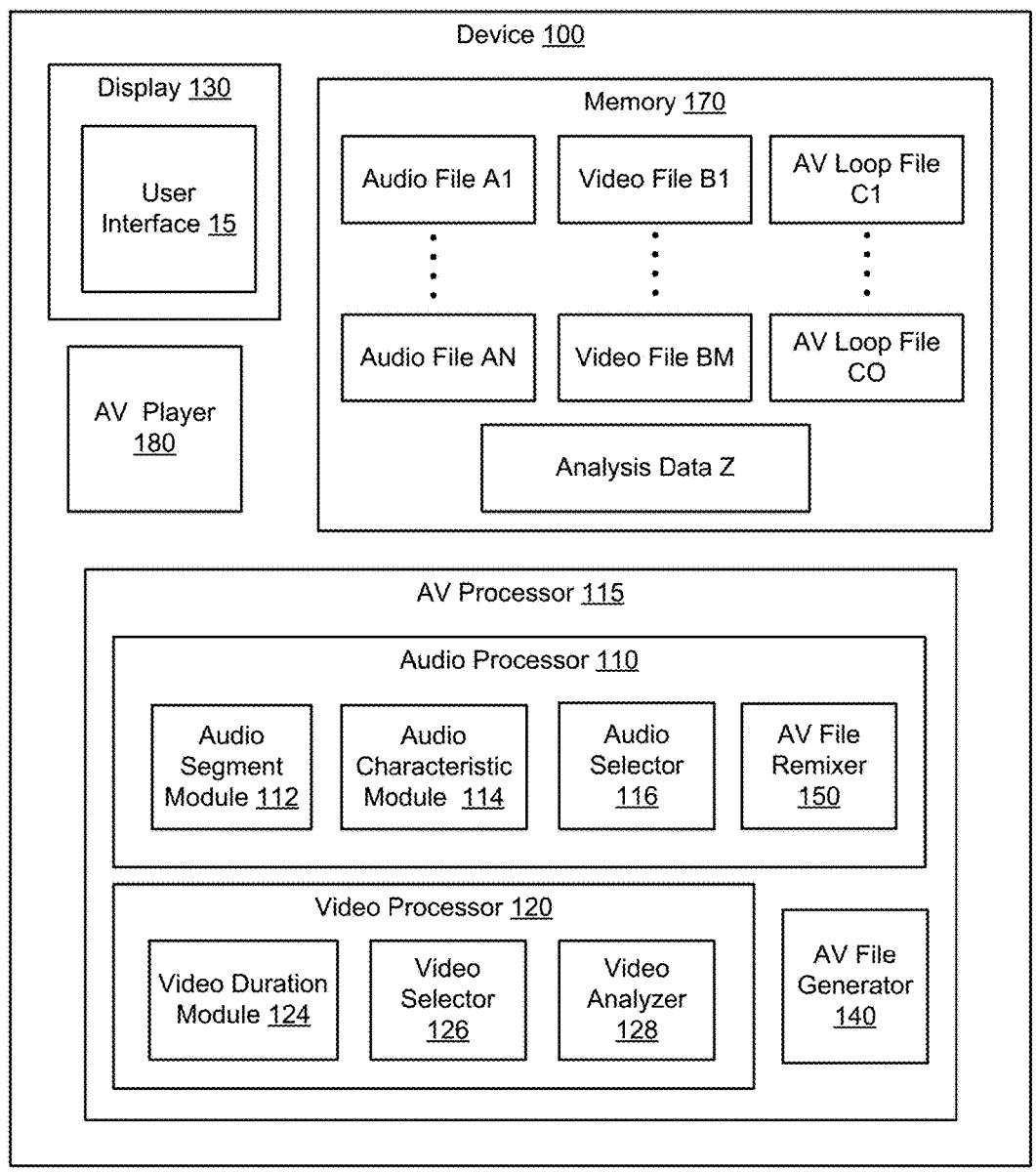
FIG. 1 is a diagram that illustrates a device that includes an AV processor according to an implementation.

An audio-visual (AV) processor can be configured to process an audio file including audio content and a video file including video content into an audio-visual (AV) loop file including a combination (e.g., a composite) of at least a portion of the audio file (e.g., a compressed or uncompressed audio file, an audio file based on an audio codec or audio format, an audio file representing audio frequencies) and at least a portion of the video file (e.g., a compressed or uncompressed video file, a video file based on a video codec or video format, a video file representing images). A portion of the audio file targeted for inclusion in the AV loop file can be referred to as an audio loop portion and a portion of the video file targeted for inclusion in the AV loop file can be referred to as a video loop portion. The AV processor can be configured to improve the quality of user-generated content such as an AV loop file on a device (e.g., a mobile device). The user-generated content included in an AV loop file can be shared, for example, via a social network, within a social environment or platform, as social media content, and/or so forth.

In some implementations, the AV loop file can have a limited duration (e.g., a duration limit of 6 seconds, a duration limit of 6.5 seconds, a duration limited 7 seconds). In some implementations, processing of audio loop portions and video loop portions can be performed by the AV processor in accordance with the condition of the time constraint.

The AV processor is configured to process, based on input from a user (e.g., a creator, a content creator, an administrator), the audio file and the video file such that the AV loop file will include video content (e.g., a video loop portion) and audio content (e.g., an audio loop portion) that can be looped in an appealing (e.g., artistically appealing) fashion. For example, the AV processor can be used by a user to create an AV loop file that includes an audio loop portion that has been edited (e.g., trimmed) based on one or more musical characteristics (e.g., beat detection (e.g., beats per minute), musical phrase detection) and matched (e.g., matched in duration, synchronized) to a video loop portion that has also edited based on content so that when the AV loop file is looped, the audio loop portion can be musically pleasing without undesirable clipping of musical phrases, onsets, and/or notes and without losing the key aspects of the video content of the video loop portion. The onset can be a point in the music where there is a change, for instance, when a singer first starts singing, and a beat can be a subdivision of beats per minute (BPM) (e.g., an average beats per minutes, beats per minute of an audio segment) of a song.

In some implementations, rather than trimming an end of a video loop portion until a duration of the video loop portion matches a duration of the audio loop portion (or vice versa), the AV processor can be configured to implement complex trimming techniques such as weighted algorithmic trimming. Accordingly, a user's cuts (in audio or video) can be trimmed automatically such that the most relevant part of each cut will be in a final AV loop file.

In some implementations, using the AV processor, a video file can be edited based on a preference of a user, and one or more aspects of the audio file (after being selected by the user) can be edited as the basis for (e.g., as a signal for) further automatic editing of the video file to create an AV loop file including both portions of the audio file and portions of the video file. In some implementations, using the AV processor, at least some portions of the audio file and the video file can be separately processed and/or jointly processed to produce the AV loop file. In some implementations, the AV processor can be configured to reconstruct an entire song (or at least a portion thereof) from multiple AV loop file sources and remix it in realtime (e.g., as a video remix). In some implementations, the AV processor can be configured detect video motion including in a video file (or a portion thereof) and can be configured to select or indicate (e.g., suggest) an audio file (or an audio loop portion) to be combined with video file (or video loop portion).

The AV processor described above can be used in a variety of applications including in, for example, entertainment networks popular for comedy skits, music, and so forth. The AV processor can be used by users to generate and share an AV loop file as multimedia content via, for example, a social network, in a social environment, and/or so forth. In some implementations, the AV processor can be included in, or associated with, one or more social media applications or platforms. The AV processor can be used by users such as, for example, musicians to collaborate, be discovered, and get signed to record deals. The AV processor can increase the ability for a user to leverage an entertainment network by functioning as a tool to enhance content (e.g., musical content).

A system configured to generate looping audio can be a technically complex system to produce for several reasons and when the looping audio is combined with video in an AV file, the system becomes even more challenging. Some of these challenges are as follows:

Understanding of musical concepts such as BPM, beats, and musical measures for generation of looping music;

The length of the video and audio are correlated and should, in some implementations, remain the same length so manual trimming of segments (e.g., cuts) may not be required;

Some devices used to implement these systems may have relatively small and/or inaccurate (e.g., jumpy) touch screens which can make precise control difficult in some implementations; and The human ear can be a remarkably precise instrument, thus, the difference between a loop being perceived as being musically on target (e.g., spot on) and off beat can be extremely small (at millisecond (ms) scale).

The AV processor described herein is configured, in some implementations, to:

Create (e.g., generate) waveforms and/or analyze audio by reading and/or decoding relatively large amounts of audio data in an asynchronous and efficient manner. In some implementations, the AV processor can be configured to render a waveform and analyze data simultaneously;

Use memory in an efficient manner while allowing for analysis of audio, which is a complex, potentially memory intensive process;

Maintain video and audio in sync while being capped by a time constraint on the final AV loop file duration;

Accounting for potential specialized modification (e.g., trimming) to achieve seamless looping; and Make video loop portion cuts dynamically and resize their modified size based on the audio loop portion such that all (or at least a portion of) the modifications cuts are represented.

FIG. 1 is a diagram that illustrates a device 100 that includes an AV processor 115 according to an implementation. As shown in FIG. 1, the device 100 also includes a display 130 and a memory 170. The AV processor 115 includes an audio processor 110 and a video processor 120.

Audio files A1 through AN (which can collectively be referred to as audio files A) and video files B1 through BN (which can collectively be referred to as video files B) are stored in the memory 170. AV loop files C1 through CO, which can collectively be referred to as AV loop files C and which are produced by an AV file generator 140 based on the audio files A and the video files B, are also stored in the memory 170. As shown in FIG. 1, a user interface 15 that can be used to control various aspects of the device 100 (e.g., the AV processor 115) is displayed in the display 130.

In some implementations, one or more of the audio files A (or an audio loop portion thereof) can be audio tracks associated with (or combined with) one or more of the video files B (or video loop portion thereof), which can be video tracks to produce the AV loop files C. In some implementations, at least one of the video files B (or a video loop portion thereof) can include audio that is further combined with (e.g., overlaid with) at least one of the audio files A to produce one of the AV loop files C. In some implementations, one or more of the AV loop files C can include multiple video tracks (from one or more of the video files B or portions thereof) and/or multiple audio tracks (from one or more of the audio files A or portions thereof and/or video files B or portions thereof).

The video processor 120 shown in FIG. 1 includes a video selector 126 that can be triggered via the user interface 15 by a user to select one of the video files B by components of the video processor 120. The video files B can be, or can be included in, a library of video files B. One or more of the video files B can be produced using, for example, the device 100. In some implementations, one or more of the video files B can be imported, copied, exported, and/or so forth. In some implementations, one or more of the video files B can be a video loop portion. A representation of a video file 20 is shown in FIG. 2A. Time is illustrated in FIG. 2A (and other figures) as progressing to the right.

The audio processor 110 shown in FIG. 1 includes an audio selector 116 that can be triggered via the user interface 15 to select one of the audio files A for processing by components of the audio processor 110. The audio files A can be, or can be included in, a library of audio files A. One or more of the audio files A can be produced using, for example, the device 100. In some implementations, one or more of the audio files A can be imported, copied, exported, and/or so forth. In some implementations, one or more of the audio files A can be an audio loop portion. A representation of an audio file 22 is shown in FIG. 2A.

The audio characteristic module 114 shown in FIG. 1 is configured to analyze musical characteristics of one or more of the audio files A (or a portion thereof). Specifically, the audio characteristic module 114 can be configured to identify segment portions or segment locations of at least one of the audio files A that that can be used to musically segment the at least one of the audio files A into an audio segment. For example, the audio characteristic module 114 can be configured to identify one or more musical measures, musical phrases, and/or collections of notes in audio file AN that can be segmented and/or looped in connection with one of the video files B. As another example, the audio characteristic module 114 can be configured to identify a segment location between musical measures, musical phrases, onsets, and/or notes in audio file AN that can be used to segment (e.g., divide) and/or loop the audio file AN in connection with one of the video files B. In some implementations, the audio characteristic module 114 can be configured to detect (e.g., identify) a speed (e.g., speed in beats per minute, an average beats per minute) of at least one of the audio files A and such information can be used to segment the at least one of the audio files A.

FIG. 2B illustrates an example of segment locations I1 through I13 within audio file 22 that have been identified (e.g., identified using the audio characteristic module 114) based one or more audio characteristics. In this example, the segment locations I1 through I13 represent locations that can be used, in combination, to segment the audio file 22 and so that a portion of the audio file 22 can be defined as an audio loop portion that can be looped in a desirable fashion (e.g., in a desirable fashion for social media sharing). The segment locations I1 through I13 can each be referred to as a snap point, break point (or location) or a segment point.

A portion of an audio file between adjacent segment locations can be referred to as audio segments. As noted above, a portion of an audio file identified for looping can be referred to as an audio loop portion. As mentioned above, the audio loop portion can be a portion of the audio file targeted for looping in an AV loop file. The audio loop portion can include one or more audio segments. A portion of a video file that can be combined with an audio loop portion as a combined AV loop file can be referred to as a video loop portion. As mentioned above, the video loop portion can be a portion of the video file targeted for looping in an AV loop file. An audio loop portion and a video loop portion can be combined into an AV loop file.

Referring back to FIG. 1, the audio segment module 112 can be configured (or triggered) to segment at least one of the audio files A based on the analysis of the at least one of the audio files A. Specifically, the audio segment module 112 can be configured to segment at least one of the audio files A based on the identified segment locations into an audio loop portion. For example, the audio segment module 112 can be configured, in response to instruction from the user via the user interface 15, to define an audio loop portion based on selected audio segments based on segment locations.

For example, the audio file 22 shown in FIG. 2C is segmented (e.g., divided) between segment location I5 and segment location I8 as audio loop portion I5-I8 (which includes audio segment I5-I6, audio segment I6-I7, and audio segment I7-I8). As shown in FIG. 2C, the audio loop portion I5-I8 has a duration of K1. The audio loop portion I5-I8 can be repeatedly looped in a fashion that is desirable from a musical perspective and/or desirable for social media content sharing. In other words, the audio loop portion I5-I8 can be looped such that the audio loop portion I5-I8 can have a desirable musical flow without, for example, undesirable breaks in musical phrases, notes, beats, and/or so forth. Specifically, during an audio loop the audio segments of the audio loop portion I5-I8 between I5-I6, I6-I7, and I7-I8 can be played in order (in the direction of progressing time). At the beginning of the first audio loop, the portion of the audio segment I5-I6 can be played after audio segment I7-I8. Because the audio loop portion I5-I8 is being looped between identified segment locations I5 and I8, the musical flow of the loop is desirable even though audio segment I5-I6 is being play after audio segment I7-I8 (which is out of order).

In some implementations, an audio loop portion can be defined using adjacent (or continuous) audio segments. In some implementations, an audio loop portion can be defined using non-adjacent (or dis-continuous) audio segments.

In some implementations, selection of audio segments for an audio loop portion can be limited by a time constraint or duration. For example, only a certain number of audio segments may be selected for an audio loop portion or audio segments may only be selected for an audio loop portion if they have a collective limited duration (e.g., a collective duration below a time limit).

As shown in FIG. 2C, a video loop portion 21 that has been selected (e.g., selected using the video selector 126 in response to a user interaction with the user interface 15) has a duration H1. The duration H1 of the video loop portion 21 is larger than the duration K1 of the audio loop portion I5-I8. In such implementations, the AV processor 115 can be configured to process the video loop portion 21 to match the video loop portion 21 with the audio loop portion I5-I8 as described below.

Specifically, the video processor 120 of the AV processor 115 in FIG. 1 includes a video segment duration module 124. The video segment duration module 124 is configured to modify a duration of at least one of the video files B based on a duration of an audio loop portion (which can include one or more audio segments) that has been segmented from an audio file A based on one or more identified segment locations. For example, if an audio loop portion has a first duration and a video file to be combined with the audio loop portion has a second duration different from the first duration, the video file can be either increased in duration (e.g., lengthened) or decreased in duration (e.g., trimmed) to match the first duration of the audio loop portion.

As shown in FIG. 2D, the video loop portion 21 is trimmed (e.g., automatically trimmed by the video segment duration module 124) to have a duration K1 that matches the duration K1 of the audio loop portion I5-I8. Also, the video loop portion 21 is aligned with the audio loop portion I5-I8 so that the video loop portion 21 and the audio loop portion I5-I8 can be combined into an AV loop portion.

As shown in FIG. 2E, the audio loop portion I5-I8 is modified to remove audio segment I6-I7 to audio loop portion I5-I7. Accordingly the duration K1 of the audio loop portion I5-I8 is decreased to duration D1 of the audio loop portion I5-I7. In response to the duration being decreased, the video loop portion 21 is trimmed (e.g., automatically trimmed by the video segment duration module 124) to have a duration D1 that matches the duration D1 of the audio loop portion I5-I7.

In some implementations, the starting point (or start time) of one or more audio loop portions described herein may not be at (or coincide with) a segment location. In some implementations, the ending (e.g., termination) point (or end time) of one or more audio loop portions described herein may not be at (or coincide with) a segment location. In some implementations, the starting point (or start time) of one or more audio loop portions described herein can be at (e.g., can be forced to be at) a segment location that can correspond with, for example, a predefined segment location, at or before an onset point, a beginning or end of a musical measure, at or before a note or beat, and/or so forth.

Figure 3A:
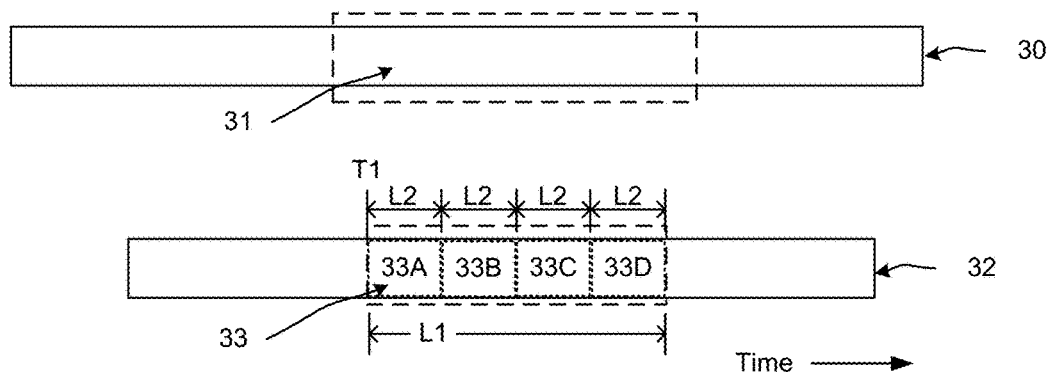
FIGS. 3A through 3C illustrate another example of processing of a video file and an audio file.
Figure 3B:
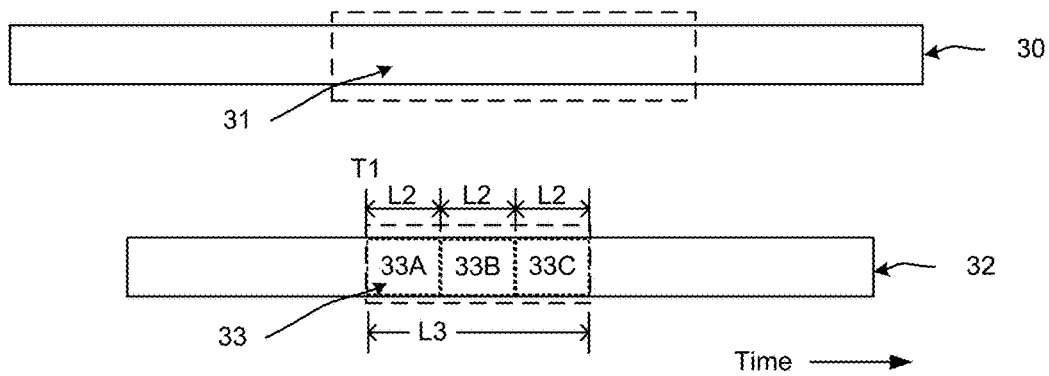
Figure 3C:
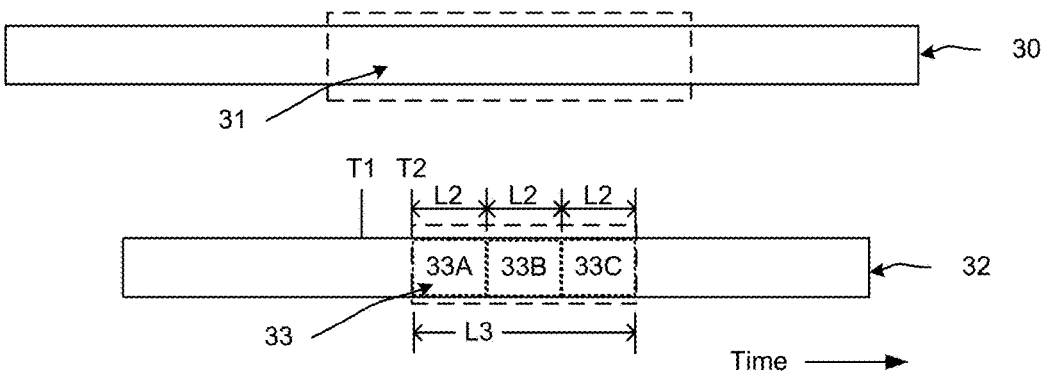

FIGS. 3A through 3C illustrate another example of processing of a video file 30 and an audio file 32. The concepts described in connection with FIGS. 3A through 3C can be combined with any of the other embodiments described above or below.

As shown in FIG. 3A, the audio loop portion 33 includes four audio segments 33A through 33D that each have a duration L2. In this example implementation, the audio segments 33A through 33D each have the same defined duration L2 and the audio loop portion 33 has a duration that is based on an integer multiple of the duration L2 of the audio segment. In some implementations, the duration of each of the audio segments 33A through 33D (which are equal in this example) can be based on the BPM (e.g., an average BPM, a median BPM) of the audio file 32. In some implementations, the duration of each of the audio segments 33A through 33D can correspond to a musical measure.

For example, if the BPM of the audio file 32 is 150 BPM (e.g., an average of 150 BPM), each of the audio segments can have 4 beats (with 4/4 time) in 1.1 s for a total duration L1 equal to 6.4 s. In other words, the duration L2 of each of the audio segments 33A through 33D can be based on a 4/4 time musical measure, which in this case, is 1.1 s because the tempo of the audio file 32 is 150 BPM. With a faster (or slower) BPM, the duration L2 of each of the audio segments 33A through 33D would be shorter (or longer). The duration L2 of each of the audio segments 33A through 33D would also be different with a different time signature (e.g., a 3/4 time signature, a 2/4 time signature).

As shown in FIG. 3B, the audio loop portion 33 is decreased in duration to three of the audio segments 33A through 33C for a total duration of L3. As shown in FIG. 3C, the audio loop portion 33 is shifted in time from start time T1 to start time T2, but the overall duration of the audio loop portion 33 is still an integer multiple of the duration L2, which in this case, includes three audio segments 33A through 33C. Accordingly, the audio segments (which can have a predefined duration) can be used within the audio loop portion 33, which can be a sliding window within the audio file 32.

In some implementations, the starting point (or start time) of the audio loop portion 33 can be at (or forced to be at) one of several segment locations (e.g., a predefined segment location, at or before an onset point, at or before a note or beat). The segment location(s) can be similar to, or the same as the segment locations described above (or below). In some implementations, audio loop portion 33 can be created anywhere (e.g., can start anywhere or terminate anywhere) in the audio file 32 so long at least one full musical measure (which corresponds to an audio segment duration) is captured. In such implementations, the left edge and/or the right edge of the audio loop portion 33 may not line up at a beginning or end of a musical measure (but may have a duration equal to or greater than a musical measure).

Although not explicitly shown in connection with FIGS. 3A through 3C, a duration of the video loop portion 31 (or a portion thereof (e.g., a video segment)) can be modified based on the audio loop portion 33 (as described above and/or below). Specifically, as discussed in many of the examples above (and below), the duration of an audio loop portion (e.g., audio loop portion I5-I8) is used to trim (e.g., automatically trimmed) a video loop portion (e.g., video loop portion 21) that is combined with the audio loop portion into an AV loop portion. In other words, the duration of the audio loop portion determines the duration of the video loop portion. Specifically, the segment locations and audio segment durations that are combined into an audio loop portion result in modification of a video loop portion that is combined with the audio loop portion into an AV loop portion.

Also as discussed above in connection with the examples, the duration of an audio loop portion can be dynamically modified based on audio segments (and/or based on segment locations), which results in the automatic modification of a video loop portion. In other words, as the audio loop portion is modified based on audio segments (e.g., addition of one or more audio segments, removal of one or more audio segments), the video loop portion that is associated with the audio loop portion is also modified.

In some implementations, a video loop portion and/or an audio loop portion can be modified in duration by being cut (e.g., cut at the beginning, end, or at a middle portion), being decreased or increased in speed (e.g., in beats per minute), and/or so forth.

Figure 4A:
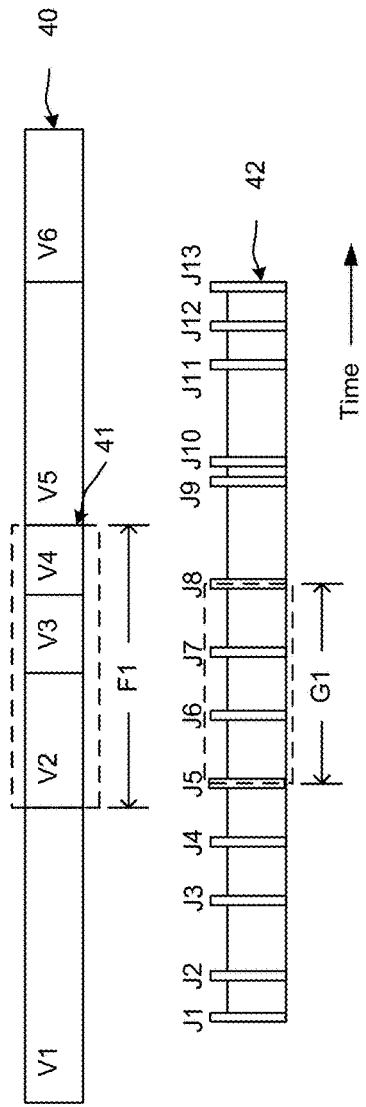
FIGS. 4A through 4C illustrate an example of a video loop portion being modified based on an audio loop portion including audio segments.
Figure 4B:
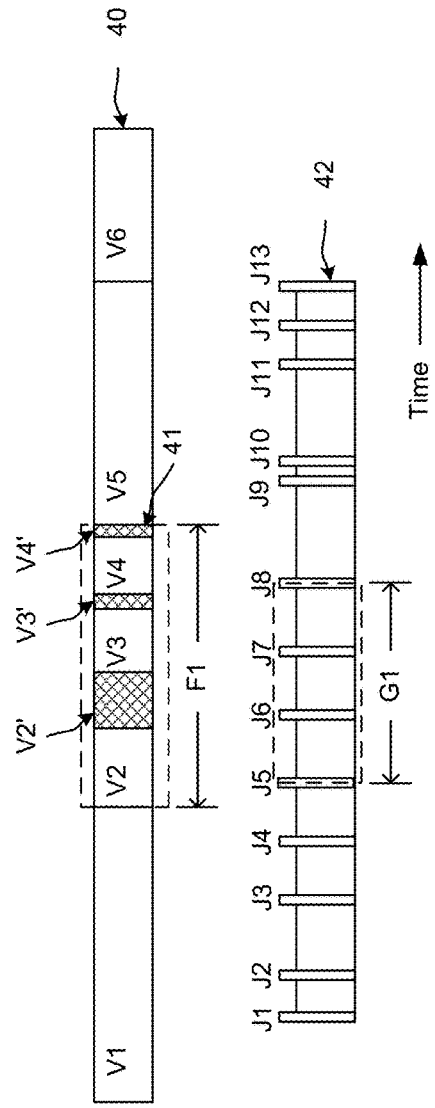
Figure 4C:
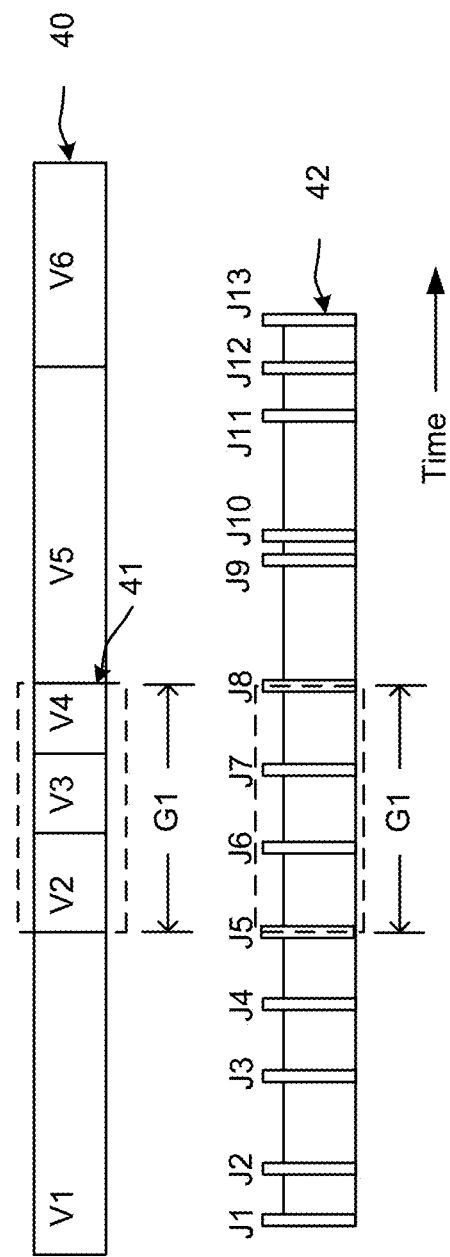

FIGS. 4A through 4C illustrate an example of a video loop portion being modified based on an audio loop portion including audio segments. A representation of a video file 40 and a representation of an audio file 42 are shown in FIGS. 4A through 4C. Time is illustrated in FIGS. 4A through 4C as progressing to the right. FIGS. 4A through 4C illustrate an example of segment locations J1 through J13 within audio file 42 that have been identified (e.g., identified using the audio characteristic module 114) based one or more audio characteristics.

As shown in FIG. 4A, audio loop portion J5-J8 having a duration G1 is selected for use in an AV loop file. The audio loop portion J5-J8 includes audio segments J5-J6, J6-J7, and J7-J8. The audio segments can be defined using the audio characteristic module 114 and the audio segment module 112 of the audio processor 110. The selection can be performed using, for example, the audio selector 116 shown in FIG. 1.

Also, shown in FIG. 4A, a video loop portion 41 having a duration F1 is selected for use in an AV loop file. The video loop portion 41 includes video segments V2, V3, and V4. The duration F1 of the video loop portion 41 is greater than the duration G1 of the audio loop portion J5-J8.

In this scenario the pre-existing video segments V2 through V4 have a collective duration that is greater than the audio loop portion J5-J8 and accordingly trimming of the video loop portion 41 is implemented to fit the duration of the audio loop portion J5-J8. Without modifying (e.g., trimming) of the video segments V2 through V4, the seamlessly looping audio loop portion J5-J8 would be shorter than the length of the draft video (which would result in a combined AV loop file that is not synchronized in audio and video content). In some implementations, modifying (e.g., crop off) the trailing video segment(s) (e.g., video segment V4) can be performed without modifying (e.g., trimming) the individual video segments V2 through V4 (e.g., each of the individual video segments V2 through V4). Manually trimming the video segments V2 through V4 to preserve the perfect loop could be tedious and time consuming in some scenarios.

As shown in FIG. 4B, portions of each of the video segments V2 through V4 of the video loop portion 41 are identified for removal from the video loop portion 41 so that the duration F1 of the video loop portion 41 can be decreased to match the duration G1 of the audio loop portion J5-J8. The portions of the video segments V2 through V4 that are identified for removal are illustrated with cross-hatched sections V2' through V4'. The portions of the video segments V2 through V4 identified for removal can be referred to as trim sections V2' through V4'. Upon removal of the trim sections V2' through V4' of the video segments V2 through V4, the duration of the video loop portion 41 is duration G1 as shown in FIG. 4C (which matches the duration G1 of the audio loop portion J5-J8). Although not illustrated in FIGS. 4A through 4C, in some implementations, portions of a video file can be added to video segments as expansion sections (not shown).

As shown in FIG. 4B, trim sections V2' through V4' have different durations. The trim sections V2' through V4' can have different durations based on weight values. Specifically, the trim section V2' has a duration greater than the trim section V3'. In this implementation, the trim section V2' can have a longer duration than the trim section V3' because the duration (e.g., original duration) of the video segment V2 is longer than the duration (e.g., original duration) of the video segment V3. In other words, the trimming can be based on the relative durations of video segments of a targeted video loop portion (which can be implemented based on weight values associated with durations of the video segments (e.g., original or starting durations of the video segments)). The trimming of video segments can be handled by the video processor 120 shown in FIG. 1.

Although not shown, in some implementations, trim sections (or expansion sections) of one or more of the video segments V2 through V4 can be associated with both a leading (or starting) edge or trailing (or terminating) edge of the video segments V2 through V4 . For example, a trim section (or expansion sections) can be removed from (or added to) a right side of the video segment V2 and the left side of the video segment V2 . In some implementations, the trim section (or expansion section) associated with the left side can be equal to (or not equal to) the trim section (or expansion section) on the right side. In some implementations, the trim sections (or expansion sections) associated with the left and right sides can have durations based on weight values. In some implementations, a trim section (or expansion section) can be associated with a middle portion of a video segment.

In some implementations, trim sections may not be removed from (or expansion sections may not be added to) one or more video segments of a video loop portion. In other words, a trim section may be removed from a first video segment (e.g., video segment V2 ) of a video loop portion, but a trim section may not be removed from a second video segment (e.g., video segment V3) of the video loop portion. Such unbalanced trimming can be specified by a user via a user preference. In some implementations, unbalanced trimming can be detected and/or triggered in response to an interaction with the video loop portion such as shifting the video loop portion to center a video segment of a video loop portion that was previously trimmed into an untrimmed window.

In some implementations, one or more of the video segments V2 through V4 can be manually adjusted while maintaining the overall duration of the video loop portion 41 by redistributing the trimmed time amongst other video segments. For example, the trim section V2' can be increased in duration (e.g., manually increased in duration, increased in duration using a larger than calculated weight value), which can result in one or more of the trim sections V3' and/or V4' to be decreased in duration. In some implementations, the decrease in the trim sections V3' and/or V4' can be based on a weight value associated with each of these trim sections. Similarly, expansion sections can be handled in a converse fashion. If a disproportionate (e.g., larger than calculated using a weight value) expansion section is added to one video segment, expansion sections associated with other video segments can be decreased in duration accordingly. In some implementations, a user preference to modify (e.g., trim), or not modify (e.g., trim), a particular portion of a video segment can be stored in a memory (e.g., the memory 170) and used to disproportionately trim video segments.

In some implementations, processing of the video segments V2 through V4 can be handled during multiple passes that can be a combination of manual and automatic trimming. In some implementations, as described above, automatic trimming can be modified based on manual intervention.

As shown in FIG. 1, the video processor 120 includes a video duration module 124. The video duration module 124 can be configured to modify (e.g., decrease, increase) the duration of one or more segments of video included within one or more video files. Specifically the video duration module 124 can be configured to modify the duration of one or more segments of a video loop portion. In some implementations, the video duration module 124 can modify one or more segments of a video based on an equation and/or algorithm (as described above (or below)). For example, a video duration module 124 can modify a segment of a video based on a linear equation, a nonlinear equation, and/or so forth. As a specific example, the video duration module 124 can modify a segment of the video in a linear fashion and/or a nonlinear fashion (e.g., logarithmic fashion) based on a duration of a segment of an audio loop portion, based on a duration of the segment of a video file (or portion thereof) compared with a duration of other segments of a video file (or portion thereof such as other segments included in a video loop portion).

As described above, in some implementations, the video duration module 124 can modify one or more segments of a video file (or video loop portion) based on the weight value associated with one or more of the video segments. In some implementations, the weight value can be assigned to a segment based on a duration of the segment of the video file (or video loop portion). In some implementations, a segment having a greater original duration can be modified in duration to a greater extent than a segment having a shorter original duration based on weight values associated with each of the segments.

In some implementations, audio segments of an audio file that can be selected for inclusion in an audio loop portion can be limited based on a targeted video loop portion. For example, referring back to the example in FIG. 4A, the AV processor 115 in FIG. 1 may be configured to prevent audio segments J6 through J10 from being selected for an AV loop file with the video loop portion 41 because the audio segments J6 through J10 have a collective duration greater than the duration F1of the video loop portion 41.

In some implementations, the selection of audio segments having a collective duration greater than a duration of a video loop portion can be permitted in situations where the video loop portion can be increased in duration. For example, in FIG. 4C, the selection of the audio segments J6 through J9 may be permitted because the duration of the video loop portion 41 can be expanded in duration to F1as shown in FIG. 4A. In some implementations, a video loop portion can be increased in duration by adding video segments such that a corresponding audio loop portion can be increased in duration by adding audio segments.

The audio files A, the video files B, and/or the AV loop files C can be in a variety of compressed or uncompressed formats. For example, one or more of the audio files A can be in a format such as MPEG-4, mp3, WAV and/or so forth. In some implementations, one or more of the video files B and/or one or more of the AV loop files C can be in a format such as windows media video (WMV), AVI, MPEG-4, 3GPP, and/or so forth.

In some implementations, the device 100 can be, for example, a wired device and/or a wireless device (e.g., wi-fi enabled device) and can be, for example, a computing entity (e.g., a personal computing device), a server device (e.g., a web server), a mobile phone, a touchscreen device, a personal digital assistant (PDA), a laptop, a television including, or associated with, one or more processors, a tablet device, e-reader, and/or so forth. The device 100 can be configured to operate based on one or more platforms (e.g., one or more similar or different platforms) that can include one or more types of hardware, software, firmware, operating systems, runtime libraries, and/or so forth.

The components (e.g., modules, processors) of the device 100 can be configured to operate based on one or more platforms (e.g., one or more similar or different platforms) that can include one or more types of hardware, software, firmware, operating systems, runtime libraries, and/or so forth. In some implementations, the components of the device 100 can be configured to operate within a cluster of devices (e.g., a server farm). In such an implementation, the functionality and processing of the components of the device 100 can be distributed to several devices of the cluster of devices.

The components of the device 100 can be, or can include, any type of hardware and/or software configured to process attributes. In some implementations, one or more portions of the components shown in the components of the device 100 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the device 100 can be, or can include, a software module configured for execution by at least one processor (not shown). In some implementations, the functionality of the components can be included in different modules and/or different components than those shown in FIG. 1.

In some implementations, one or more of the components of the device 100 can be, or can include, processors configured to process instructions stored in a memory (e.g., memory 365). For example, the AV processor 115 (and/or a portion thereof) can be, or can include, a combination of a processor and a memory configured to execute instructions related to a process to implement one or more functions.

In some implementations, the memory 170 can be a remote memory, a local memory, and/or so forth. In some implementations, the memory 170 can be, or can include, a memory shared by multiple devices such as device 100. In some implementations, the memory 170 can be associated with a server device (not shown) within a network and configured to serve the components of the device 100.

Although not shown, in some implementations, the components of the device 100 can be configured to operate within, for example, a data center (e.g., a cloud computing environment), a computer system, one or more server/host devices, and/or so forth. In some implementations, the components of the device 100 can be configured to operate within a network. Thus, the components of the device 100 can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 170 of the device 100 can be any type of memory such as a random-access memory, a disk drive memory, flash memory, and/or so forth. In some implementations, the memory 170 can be implemented as more than one memory component (e.g., more than one RAM component or disk drive memory) associated with the components of the device 100.

Figure 5:
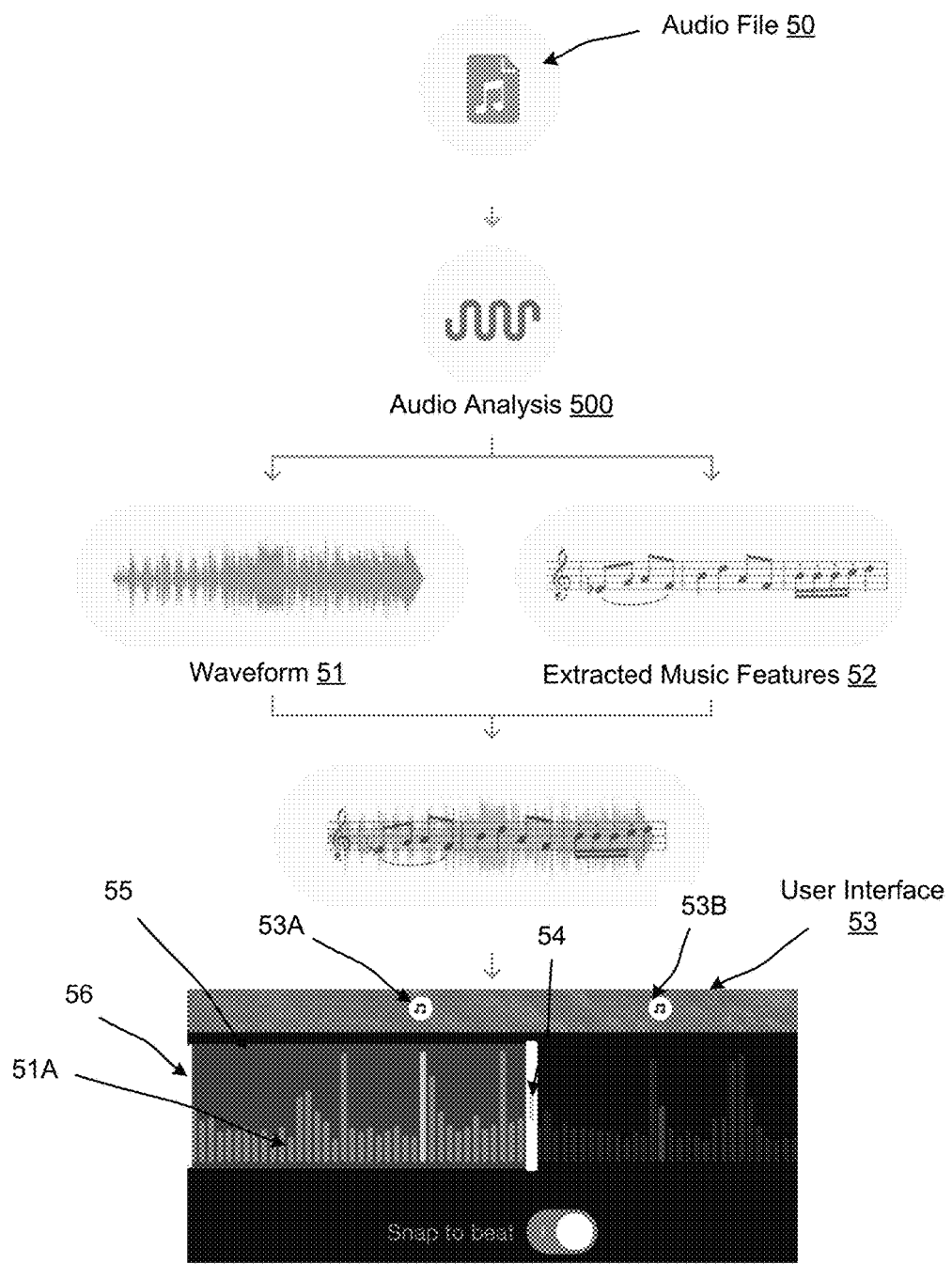
FIG. 5 is a flowchart that illustrates a process involved in transforming an audio source into a looping audio-visual (AV) loop file.

FIG. 5 is a flowchart that illustrates a process involved in transforming an audio source into a looping AV loop file. First, an audio file 50, which is the audio source, is analyzed (see audio analysis 500) (e.g., analyzed using the audio characteristic module 114 shown in FIG. 1). In some implementations, every sample in the music file is analyzed. In some implementations, beats and onsets can be analyzed. In some implementations, beats and onsets can be analyzed while simultaneously create a running average of the BPM of the audio file 50. In some implementations, the BPM can be a measure of tempo, which can be a metronome mark in a musical score.

FIG. 5 illustrates a waveform 51 extracted from the audio file 50 based on the audio analysis 500. Extracted musical features 52 and an overlay of the extracted musical features 52 and the waveform 51 are also illustrated in the flowchart. A waveform representation 51A of the waveform 51 is illustrated in a user interface 53 (which can be at least a portion of user interface 15 shown in FIG. 1).

As shown in the user interface 53, snap to beat functionality (which can activate functionality in the AV processor) is activated using a button. In some implementations, when the audio file 50 is selected, analysis of the audio (e.g., by the audio characteristic module 114 shown in FIG. 1) can be automatically triggered. In some implementations, the audio of the audio file 50 can be analyzed to identify the BPM, which can then be used for one or more segment locations and/or audio segment durations.

In the user interface 53 shown in FIG. 5, segment locations are represented by segment location indicators 53A, 53B. In some implementations, the segment locations can be defined with fixed durations corresponding to a musical measure. In some implementations, trim handle 54 of an audio loop portion selector 55 (which can be used to define an audio loop portion of the waveform 51) can be moved to the left or to the right and can be configured to snap to at least one of the segment locations represented by the segment location indicators 53A, 53B (such that at least a full musical measure is captured). A left hand edge 56 of the audio loop portion selector 55 can be configured to start at least one of a beat or onset. The onset can be a point in the music where there is a change, for instance, when the singer first starts singing, and a beat can be a subdivision of the BPM of the audio file 50.

In some implementations, audio loop portion can be created anywhere in the audio file 50 so long at least one full musical measure is captured. In this implementation, different portions of the audio file 50 can be selected by moving the waveform representation 51A (e.g., scrolling the waveform) to the left or to the right. In some implementations, the left side 56 and/or trim handle 54 of the audio loop portion selector 55 do not line up at a being or end of a musical measure.

Referring back to FIG. 1, in some implementations, the audio characteristic module 114 can be configured to analyze each sample in at least one of the audio files A while simultaneously analyzing the musical aspects such as the BPM, onsets, beats, and the waveform data. In some implementations, this process can be performed asynchronously so that a user can make changes and experiment even while the process is underway. Once complete, the analysis can be stored in the memory 170 in analysis data Z for use should a user wish to reuse the same audio file. The size of this analysis data Z can be orders of magnitude smaller than the raw audio data associated with one or more of the audio files A.

In some implementations, an AV player 180 can be implemented (and displayed in the user interface 15) to achieve fast and efficient AV loop file processing. In some implementations, the AV player 180 can be a player that can loop without pausing and a sample accurate audio player that can loop on a single sample. In some implementations, the AV player 180 can be configured so that a preview in an Edit view of the user interfaced 15 can match a finalized version of at least one of the AV loop file C. As a user experiments with various segment locations (e.g., scrub and snap points) using the user interface 15, in the background, the AV processor 115 can be configured to fine tune interactions to exceed the resolution and precision normally available on a touchscreen device. In some implementations, each movement is quantized to a musically relevant segment location to ensure that a desirable possible audio looping is easily accessed.

In some implementations, as the audio files A, which can be compressed, are processed, the first step can be to read and convert the samples from their various formats to a Linear Pulse Code Modulation (PCM) Floats. In some implementations, direct access to raw PCM data can be used by the audio characteristic module 114. In some implementations, each packet can be converted into N number of PCM samples. Once a sample is unpacked some samples (e.g., ~4096 PCM samples) can be buffered and processed through the audio characteristic module 114. The audio characteristic module 114 can provide a waveform representation for the file and/or musical beat metadata in one pass. Because this can be performed asynchronously the user interface 15 can be ready (e.g., always ready) and can be used at any time. BPM and looping points can be updated in real time as analysis of the audio characteristic module 114 progresses.

In some implementations, the audio characteristic module 114 can be configured to represent (e.g., fully represent) a waveform and/or musical beat metadata for one of the audio files A in a relatively small amount of space. For example, an audio file with a size as an mp4 file can be approximately 8 megabytes (MB) for an approximately 4 minute song. The audio characteristic module 114 can be configured to reduce the key features of the audio file, the waveform representation, and music beat metadata in approximately 58 kilobytes (KB).

Because of these optimizations described above, the processing described above performed by the AV processor 115 (e.g., waveform scrolling, analysis of an audio file, selection of an audio loop portion, modification of a corresponding video loop file) can happen relatively fast. The AV processor 115 can be configured to handle an audio file of any length. In some implementations, the analysis of an 8 MB audio file and creation of music beat metadata file based on the 8 MB audio file can be performed, in some implementations, in 15 seconds or less. By representing massive amounts of audio data in a compacted format a high performance user experience can be achieved.

The AV processor 115 includes an AV file remixer 150 that can be configured to reconstruct an audio file (e.g., an entire song) (or at least a portion thereof) from multiple AV loop file sources and remix it in realtime (e.g., as a video remix). For example, a first AV loop file including a first portion of a song by an artist can be appended to a second AV loop file including a second portion (subsequent to the first portion) of the song by the artist to collectively produce an AV file that includes both the first portion of the song and the second portion of the song. In in this manner, multiple different AV loop files can be combined (e.g., stitched) to produce a complete audio rendering of the song with snippets of video that are included in each of the different AV loop files. In some implementations, AV loop files that have overlapping audio portions can be processed so that only audio and video content associated one of the AV loop files is used (for at least the previously overlapping portion). In some implementations, the multiple AV loop file sources can be distributed across a network (e.g., a social media network) (not shown), can be stored in various memory locations (not shown), can be indexed in a database where they can be searched (not shown), and/or so forth.

In some implementations, the video analyzer 128 of the video processor 120 of the AV processor 115 can be configured to detect video characteristics (e.g., motion, color) including in at least one of the video files B (or a portion thereof) and can be configured to select or indicate (e.g., suggest) one or more of the audio files A (or an audio loop portion) to be combined with video file B (or video loop portion). For example, if the video file that has been selected has a relatively high level of motion, an audio file that has a high BPM rate can be suggested via the user interface 15 for selection by a user. As another example, if the video file that has been selected has a relatively low level of motion, an audio file that has a low BPM rate can be suggested via the user interface 15 for selection by a user. As yet another example, if the video file that has been selected has a threshold level of variation in color or contrast, an audio file that has a low BPM rate or a high BPM rate can be suggested via the user interface 15 for selection by a user.

As mentioned above in connection with FIG. 1, the user interface 15, which is displayed in the display 130, can be used to control various aspects of the device 100 (e.g., the AV processor 115). Various implementations of the user interface 15 are illustrated in at least FIGS. 6A through 6D.

Figure 6A:
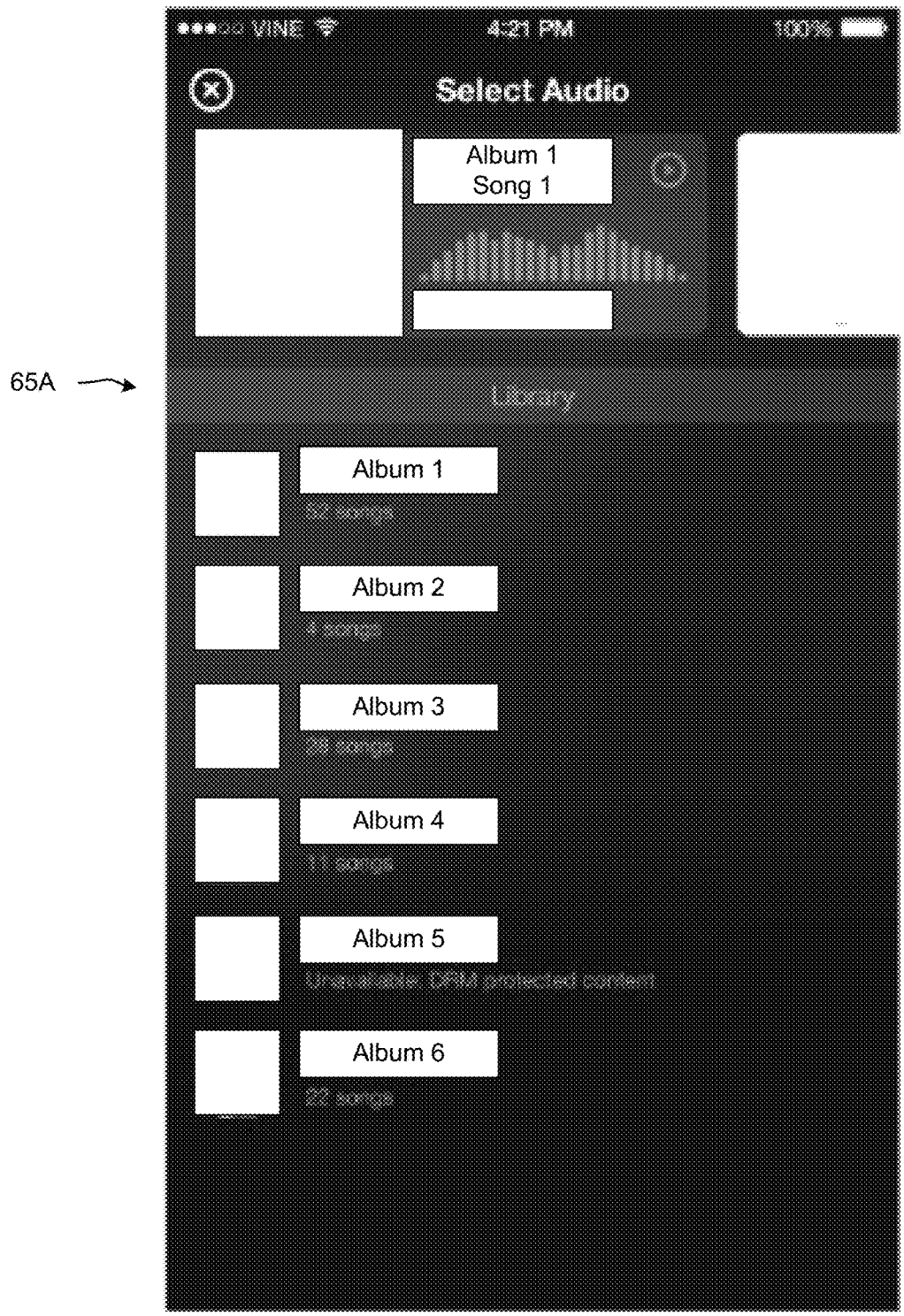
FIGS. 6A through 6D illustrates various representations of user interfaces.

As shown in FIG. 6A, the user interface 65A includes a library of several albums (Albums 1 through 6) that include various songs. In this implementation, Album 1 with Song 1 is selected (e.g., triggering selection via the audio selector 116). In response to the selection of Album 1 and Song 1, the audio characteristic module 114 of the audio processor 110 can be configured to analyze Song 1 of Album 1.

Figure 6B:
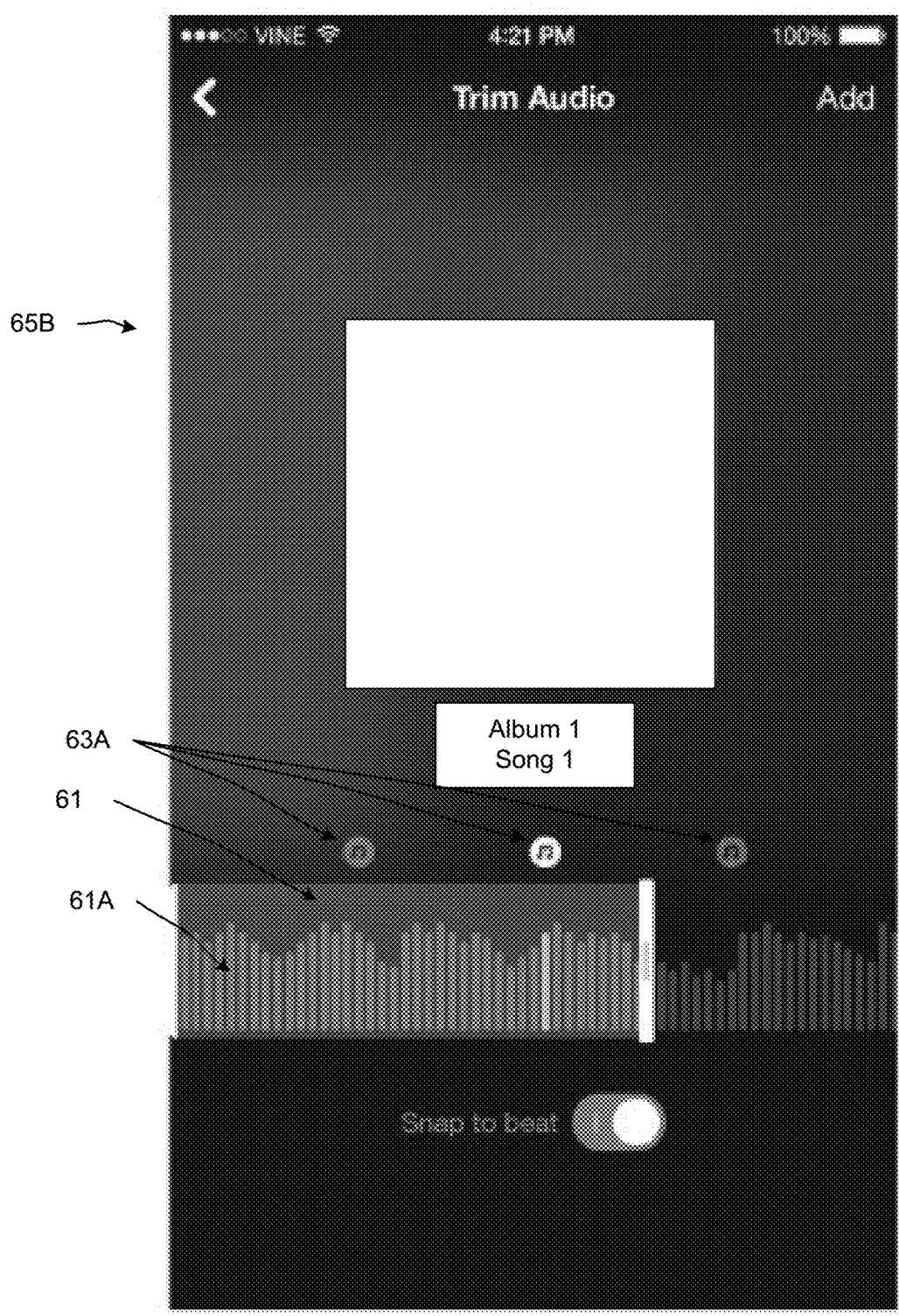

In FIG. 6B, a waveform representation 61A of Song 1 of Album 1 is shown in user interface 65B along with segment location indicators 63A. An audio loop portion selector 61 is also shown. In this figure, the loop portion selector 61 has not yet been moved to align with one of the segment location indicators 63A. In some implementations, a preview of a video loop portion selected for combining with the audio loop portion can be included in this user interface 65B.

Figure 6C:
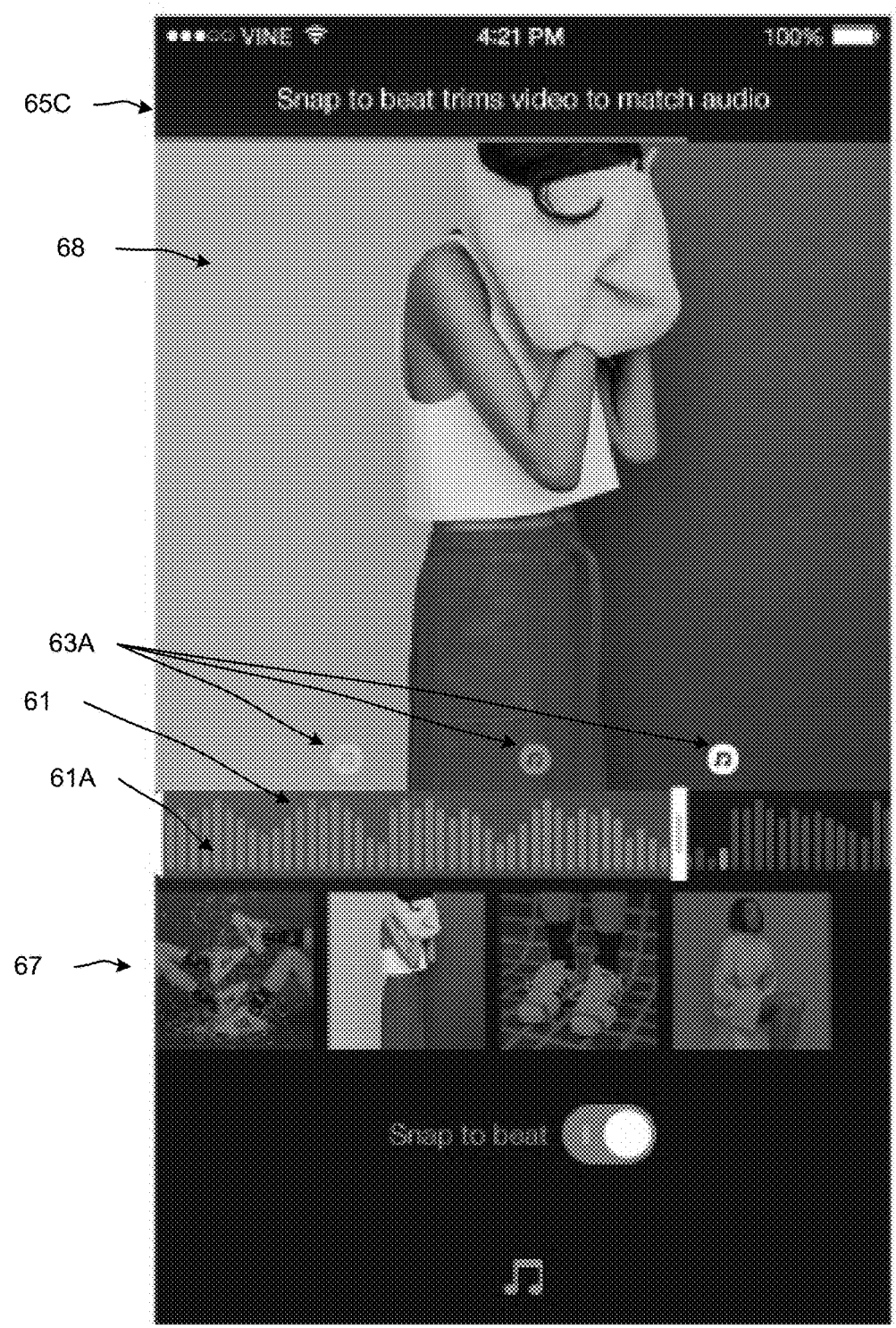

In FIG. 6C, a preview 68 of a video loop portion including video segments 67 is shown in user interface 65C. Also, the waveform representation 61A, segment location indicators 63A, and audio loop tool selector 61 are shown. In this figure, the loop portion selector 61 has not yet been moved to align with one of the segment location indicators 63A. After the loop portion selector 61 is moved to align with one of the segment location indicators 63A to define an audio loop portion, the video loop portion (e.g., video segments 67) can be modified to match the duration of the audio loop portion.

Figure 6D:
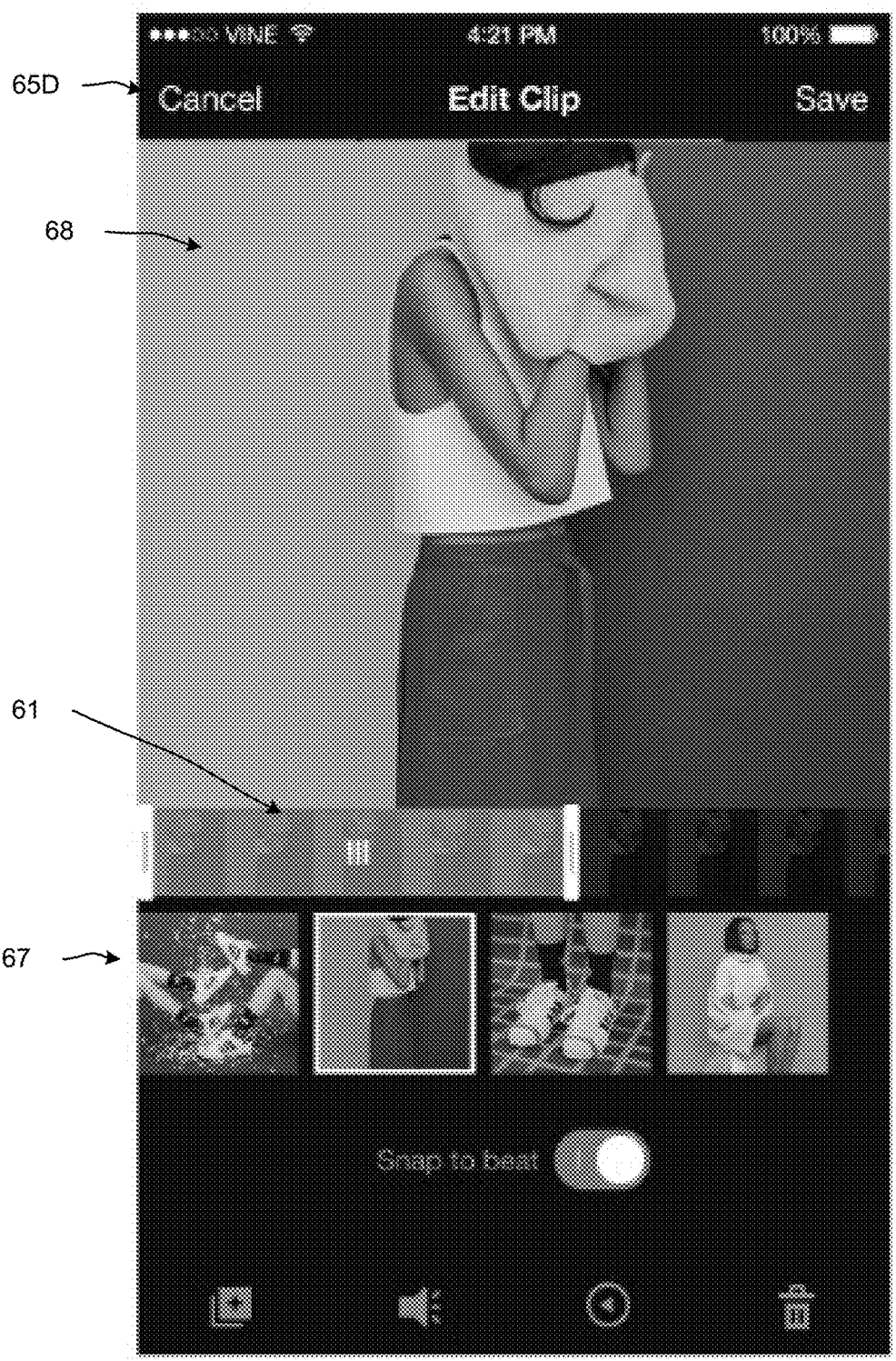

In user interface 65D, shown in FIG. 6D, one or more of the video segments 67 can be manually edited to match a selected audio loop portion.

Figure 7:
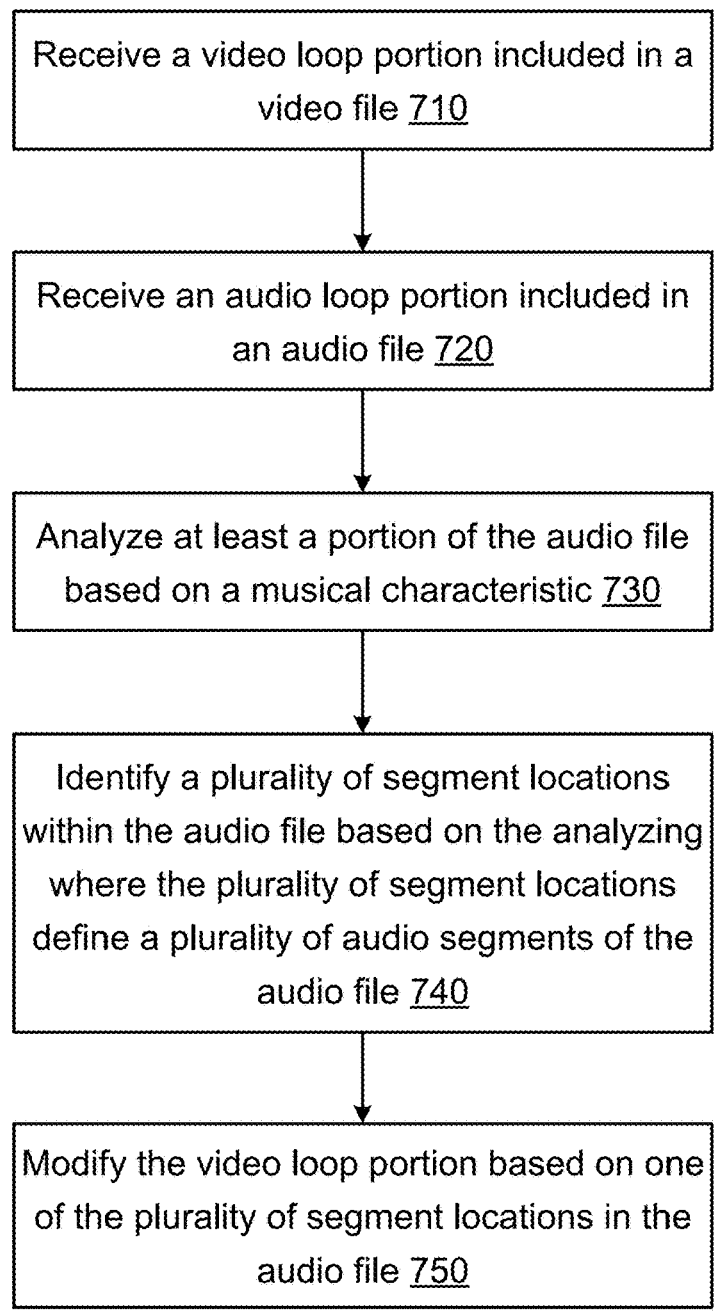
FIGS. 7 and 8 illustrate flowcharts associated with processing of a video file and an audio file.

FIG. 7 is a flowchart 700 that illustrates a method of processing a video file and an audio file. Various portions of the flowchart 700 can be performed by the components included in the device 100 shown in FIG. 1.

As shown in FIG. 7, a video loop portion included in a video file is received (block 710). In some implementations, the video file can be selected using the video selector 126 shown in FIG. 1.

An audio loop portion included in audio file is received (block 720). In some implementations, the audio file can be selected using the audio selector 116 shown in FIG. 1.

At least a portion of the audio file is analyzed based on a musical characteristic (block 730). In some implementations, the musical characteristic can be associated with a musical measure, a number of beats per minute, an onset, a beat, and/or so forth. In some implementations, the audio file is analyzed using the audio characteristic module 114 shown in FIG. 1.

A plurality of segment locations within the audio file are identified based on the analyzing, where the plurality of segment locations define a plurality of audio segments of the audio file (block 740). In some implementations, the plurality of segment locations can be identified using the audio signal module 112 shown in FIG. 1.

The video loop portion is modified based on one of the plurality of segment locations in the audio file (block 750). In some implementations, the video loop portion is modified using the video processor 120 (e.g., the video weight module 122 and/or the video duration module 124) shown in FIG. 1.

Figure 8:
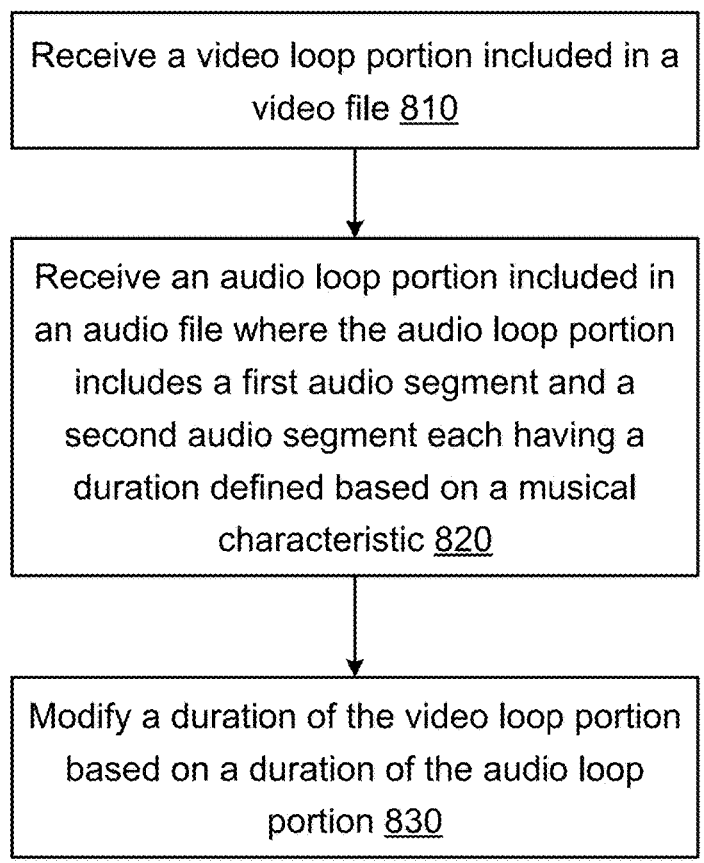

FIG. 8 is a flowchart 800 that illustrates a method of processing a video file and an audio file. Various portions of the flowchart 800 can be performed by the components included in the device 100 shown in FIG. 1.

As shown in FIG. 8, a video loop portion included in a video file is received (block 810). In some implementations, the video file can be selected using the video selector 126 shown in FIG. 1.

An audio loop portion included in audio file is received where the audio loop portion includes a first audio segment and a second audio segment each having a duration defined based on a musical characteristic (block 820). In some implementations, the audio file can be selected using the audio selector 116 shown in FIG. 1. In some implementations, the musical characteristic can be associated with a musical measure, a number of beats per minute, an onset, a beat, and/or so forth. In some implementations, the audio file is analyzed using the audio characteristic module 114 shown in FIG. 1.

A duration of the video loop portion is modified based on a duration of the audio loop portion (block 830). In some implementations, the video loop portion is modified using the video processor 120 (e.g., the video weight module 122 and/or the video duration module 124) shown in FIG. 1.

In one general aspect, a method can include receiving a video loop portion included in a video file, receiving an audio loop portion included in an audio file, analyzing at least a portion of the audio file based on a musical characteristic, and identifying a plurality of segment locations within the audio file based on the analyzing. The plurality of segment locations can define a plurality of audio segments of the audio file. The method can also include modifying the video loop portion based on one of the plurality of segment locations in the audio file. This general aspect can be performed by a system including the elements described in connection with, for example, FIG. 1, and/or this general aspect can be executed by executable instructions stored on a non-transitory computer-readable medium. This general aspect can be combined with any combination of the features below, except for mutually exclusive combinations:

the video loop portion can have a duration that is modified based on a duration of the audio loop portion;

the video loop portion can include in the video file is targeted for looping in an audio-visual (AV) loop file;

the video loop portion can include a first video segment and a second video segment where the method can also include assigning a first weight value to the first video segment and a second weight value to the second video segment. The modifying the video loop portion can include modifying a duration of the first video segment based on the first weight value and a duration of the second video segment based on the second weight value;

the first weight value can be different than the second weight value;

the first weight value and the second weight value can be assigned based on the duration of the first video segment compared with the duration of the second video segment;

the first weight value can be proportional to the duration of the first video segment;

the plurality of segment locations can be associated with at least one of an onset or a beat;

a duration of at least one of the plurality of audio segments can be associated with a musical measure;

a duration of at least one of the plurality of audio segments can be associated with a number of beats per minute;

the video loop portion can have a duration less than 6.5 second and the video file has a duration greater than 6.5 seconds; and the audio loop portion can have a duration less than 6.5 second and the audio file has a duration greater than 6.5 seconds.

In another general aspect, a method can include receiving a video loop portion included in a video file, receiving an audio loop portion included in an audio file where the audio loop portion can include a first audio segment and a second audio segment each having a duration defined based on a musical characteristic, and modifying a duration of the video loop portion based on a duration of the audio loop portion. This general aspect can be performed by a system including the elements described in connection with, for example, FIG. 1, and/or this general aspect can be executed by executable instructions stored on a non-transitory computer-readable medium. This general aspect can be combined with any combination of the features below, except for mutually exclusive combinations:

the method can also include receiving an instruction to include a third audio segment in the audio loop portion, and modifying a duration of the video loop portion based on the duration of the third audio segment;

the first audio segment can have a duration equal to a duration of the second audio segment;

the first audio segment and the second audio segment can each have a duration equal to a duration of a musical measure calculated based on an average number of beats per minute of the audio file;

the video loop portion can include a plurality of video segments, and the method further comprising assigning a weight value to each of the plurality of video segments where the modifying the duration of the video loop portion can include modifying a duration of at least one of the plurality of video segments based on the weight value associated with the at least one of the plurality of video segments; and each of the weight values assigned to each of the plurality of the video segments can be based on a duration of each of the plurality of video segments.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
receiving a video loop portion included in a video file;
receiving an audio loop portion included in an audio file;
analyzing at least a portion of the audio file based on a musical characteristic;
identifying a plurality of segment locations within the audio file based on the analyzing, the plurality of segment locations defining a plurality of audio segments of the audio file;
presenting, in a user interface, segment location indicators representing at least some of the identified plurality of segment locations within the audio file;
receiving a modification of an audio loop portion selector configured for selecting any number of the presented segment location indicators; and
automatically modifying the video loop portion based on at least one of the plurality of segment locations in the audio file as indicated by the audio loop portion selector.

2. The method of claim 1, wherein the video loop portion has a duration that is modified based on a duration of the audio loop portion.

3. The method of claim 1, wherein the video loop portion included in the video file is targeted for looping in an audio-visual (AV) loop file.

4. The method of claim 1, wherein the video loop portion includes a first video segment and a second video segment, the method further comprising:
assigning a first weight value to the first video segment and a second weight value to the second video segment, the modifying the video loop portion includes modifying a duration of the first video segment based on the first weight value and a duration of the second video segment based on the second weight value.

5. The method of claim 4, wherein the first weight value is different than the second weight value.

6. The method of claim 4, wherein the first weight value and the second weight value are assigned based on the duration of the first video segment compared with the duration of the second video segment.

7. The method of claim 4, wherein the first weight value is proportional to the duration of the first video segment.

8. The method of claim 1, wherein the plurality of segment locations are associated with at least one of an onset or a beat.

9. The method of claim 1, wherein a duration of at least one of the plurality of audio segments is associated with a musical measure.

10. The method of claim 1, wherein a duration of at least one of the plurality of audio segments is associated with a number of beats per minute.

11. The method of claim 1, wherein the video loop portion has a duration less than 6.5 second and the video file has a duration greater than 6.5 seconds.

12. The method of claim 1, wherein the audio loop portion has a duration less than 6.5 second and the audio file has a duration greater than 6.5 seconds.

13. A method, comprising:
receiving a video loop portion included in a video file;
receiving an audio loop portion included in an audio file, the audio loop portion including a first audio segment and a second audio segment each having a duration defined based on a musical characteristic;
presenting, in a user interface, segment location indicators representing at least the first and second audio segments;
receiving a modification of the audio loop portion made using an audio loop portion selector configured for selecting any number of the presented segment location indicators; and
automatically modifying a duration of the video loop portion based on a duration of the modified audio loop portion.

14. The method of claim 13, further comprising:
receiving an instruction to include a third audio segment in the audio loop portion; and
modifying a duration of the video loop portion based on the duration of the third audio segment.

15. The method of claim 13, wherein the first audio segment has a duration equal to a duration of the second audio segment.

16. The method of claim 13, wherein the first audio segment and the second audio segment each have a duration equal to a duration of a musical measure calculated based on an average number of beats per minute of the audio file.

17. The method of claim 13, wherein the video loop portion includes a plurality of video segments,
the method further comprising:
assigning a weight value to each of the plurality of video segments,
the modifying the duration of the video loop portion includes modifying a duration of at least one of the plurality of video segments based on the weight value associated with the at least one of the plurality of video segments.

18. The method of claim 17, wherein each of the weight values assigned to each of the plurality of the video segments is based on a duration of each of the plurality of video segments.

* * * * *